(12) United States Patent
Landwerlen (10) Patent No.: US 6,666,396 B2
(45) Date of Patent: Dec. 23, 2003

(54) MULTIDIRECTIONAL ROTATABLE HANDLE

(75) Inventor: Joseph Landwerlen, Shelbyville, IN (US)

(73) Assignee: Gator Grip, Inc., Shelbyville, IL (US)

( * ) Notice: Subject to any disclaimer, the term of this patent is extended or adjusted under 35 U.S.C. 154(b) by 0 days.

(21) Appl. No.: 10/164,882

(22) Filed: Jun. 7, 2002

(65) Prior Publication Data

US 2002/0185562 A1 Dec. 12, 2002

Related U.S. Application Data

(60) Provisional application No. 60/297,333, filed on Jun. 11, 2001.

(51) Int. Cl.$^7$ ............................................. A01K 89/015
(52) U.S. Cl. ......................................... 242/283; 74/574
(58) Field of Search .............................. 242/282, 283, 242/284; 74/574

(56) References Cited

U.S. PATENT DOCUMENTS

| | | | |
|---|---|---|---|
| 4,068,960 A | | 1/1978 | Swager |
| 4,117,568 A | | 10/1978 | Bullock |
| D265,497 S | * | 7/1982 | Sakamoto et al. ......... D22/140 |
| 4,368,856 A | | 1/1983 | Neufeld |
| 4,573,252 A | | 3/1986 | Shay |
| 4,586,696 A | | 5/1986 | Mugford et al. |
| 4,768,909 A | | 9/1988 | Warkotsch |
| 4,892,172 A | | 1/1990 | Hobson |
| 5,092,145 A | | 3/1992 | Haldric et al. |
| 5,201,241 A | | 4/1993 | Pollack |
| 5,308,183 A | | 5/1994 | Stegeman et al. |
| 5,335,409 A | | 8/1994 | Elvebak |
| D369,967 S | | 5/1996 | Decursu et al. |
| 5,529,255 A | * | 6/1996 | Asano et al. ............... 242/268 |
| 5,643,095 A | | 7/1997 | Probst |
| 5,660,344 A | * | 8/1997 | Testa ........................... 242/283 |
| 5,690,290 A | * | 11/1997 | Asano et al. ................ 242/283 |
| 5,752,399 A | | 5/1998 | Shen |
| 5,782,442 A | | 7/1998 | Kwak et al. |
| 5,802,673 A | | 9/1998 | Nemeth |
| 5,897,072 A | | 4/1999 | Lok |
| 5,904,342 A | | 5/1999 | Laarman |
| 5,906,323 A | * | 5/1999 | Morimoto et al. .......... 242/283 |
| D415,241 S | | 10/1999 | Staehle et al. |
| 6,029,922 A | | 2/2000 | Kim et al. |
| D443,018 S | | 5/2001 | Kang et al. |
| 6,286,774 B1 | * | 9/2001 | Oh .............................. 242/283 |
| 6,305,627 B1 | * | 10/2001 | Stiner et al. ................ 242/283 |
| 6,364,229 B1 | * | 4/2002 | Kang .......................... 242/283 |

* cited by examiner

Primary Examiner—Emmanuel M Marcelo
(74) Attorney, Agent, or Firm—Woodard, Emhardt, Moriarty, McNett & Henry LLP (57) ABSTRACT

One preferred embodiment of the present invention provides a handle and shaft assembly including a rotatable shaft with a shaped end portion, where the shaped end portion has a non-circular cross-section. A handle cross-member is mounted to the shaft. A first distal portion of the cross-member is offset from the shaft. A pedestal is mounted to the distal portion of the cross-member. A ball portion is associated with the pedestal. In one embodiment, a knob defines a socket, which is coupled to the cross-member with a ball and socket joint. In a preferred shaft connection assembly, a locking member is fittingly engaged to the shaped end portion of the rotatable shaft such that the locking member and the rotatable shaft are substantially rigid in rotation. The locking member is also fittingly engaged with the cross-member such that the locking member and the cross-member are also substantially rigid in rotation. In one alternate embodiment, the locking member is a washer with an internal channel which engages the shaped end portion of the shaft. The washer includes a periphery which engages the cross-member to prevent movement between the cross-member and the shaft.

19 Claims, 5 Drawing Sheets

MULTIDIRECTIONAL ROTATABLE HANDLE

This application claims priority to and incorporates by reference U.S. Provisional Application Serial No. 60/297,333 filed Jun. 11, 2001.

FIELD OF THE INVENTION

The present invention deals with rotatable handles, and, more specifically, with an ergonomically designed handle and locking mechanism for attaching a handle to a rotational member. An example of such device is a handle on a fishing reel or a crank handle.

BACKGROUND OF THE INVENTION

When mounting a handle on a rotatable shaft, a number of engineering issues are encountered. Such handles are used to impart rotational force and motion to a rotatable shaft, such as on a fishing reel or crank handle. One mechanical difficulty arises in providing the user a handle that can be securely gripped and rotated without requiring the user to loosen or release the user's grip on the handle in order to reposition the user's grip during rotation. A further difficulty is encountered in providing the user a handle that can be securely gripped during rotation when the orientation of the apparatus, such as movement of the shaft and handle on a fishing pole, changes with respect to the user during use, such that the handle becomes awkward to hold or a person's grip needs to be adjusted in more than one direction.

A second mechanical difficulty is encountered in mounting the handle to the rotatable shaft. The handle is generally mounted in a direction perpendicular to the rotatable shaft to provide the greatest lever arm, and turned in a circular direction. Difficulties have been encountered in reliably and durably mounting the handle to a round rotatable shaft to supply sufficient torque without breaking. Additional difficulties have been encountered when designing a method whereby the user can easily couple and decouple the handle to the rotatable shaft while providing a secure coupling when the two are connected.

The present invention addresses these concerns and others.

SUMMARY OF THE INVENTION

Preferred embodiments of the present invention allow a handle, such as for a fishing reel, to be securely grasped during rotation of the handle. Alternate preferred embodiments and features provide a simple and secure coupling between the handle and a rotatable shaft, such as to the spool of a fishing reel.

In one preferred embodiment, a handle and shaft assembly includes a rotatable shaft with a shaped end portion, where the shaped end portion is non-circular in cross-section. A handle cross-member is mounted perpendicularly to the rotatable shaft at a shaft mounting location. At least a first distal portion of the cross-member is offset from the shaft mounting location. A pedestal having a long axis is mounted to the distal portion of the cross-member. The pedestal includes a ball portion. A knob defines a socket which is coupled to the ball portion to form a handle with a ball and socket joint.

In a preferred shaft connection assembly, a locking member is fittingly engaged to the shaped end portion of the rotatable shaft such that the locking member and the rotatable shaft are substantially rigid in rotation. The locking member is also fittingly engaged with the cross-member such that the locking member and the cross-member are also substantially rigid in rotation. In one embodiment, the locking member is a cap which receives the shaped end portion of the rotatable shaft and which includes prongs with locking flanges which extend through corresponding openings defined in the cross-member.

In an alternate embodiment, the locking member is a washer with an internal channel which engages the shaped end portion of the shaft. The washer preferably includes a periphery which engages the cross-member to prevent relative rotational movement between the cross-member and the shaft. The washer can engage the cross-member by engaging prongs extending from a cap or by engaging protuberances formed in the cross-member.

It is one preferred object of the present invention to provide an improved handle and shaft assembly.

It is an alternate preferred embodiment of the present invention to provide an improved fishing reel handle assembly.

Other objects and advantages of preferred embodiments of the present invention shall be apparent from the accompanying drawings and description.

DESCRIPTION OF PREFERRED EMBODIMENTS

For the purposes of promoting an understanding of the principles of the invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

An ergonomically mounted knob for a rotational handle is illustrated and described in a preferred embodiment of the present invention. The ergonomic knob and handle assist a user in rotating the handle in a circular direction as the handle and rotatable shaft change position, without requiring the user to change the user's grip on the knob. In an alternate feature, the present invention provides an improved method and structure for attaching a handle to a rotatable shaft.

Some preferred embodiments of the present invention are illustrated in FIGS. 1–6. Handle 10 is illustrated in a partially cut-away side view in FIG. 1. Rotatable shaft 50 defines an axis of rotation A. Handle 10 includes cross-member 20, knobs 30 and shaft mounting assembly 40. Cross-member 20 is normally mounted in a plane perpendicular to the rotatable shaft 50 which is intended to be driven by the cross-member 20. Shaft 50 may extend to a further assembly, such as a fishing reel, gearing assembly or a similar mechanism. Cross-member 20 may be a single arm extending in one direction, a dual arm handle extending to either side from the shaft mounting location as shown, or a multiple arm handle extending in multiple directions from the shaft mounting location and mounting assembly 40, where the multiple directions are preferably generally in the same geometric plane.

Figure 1:
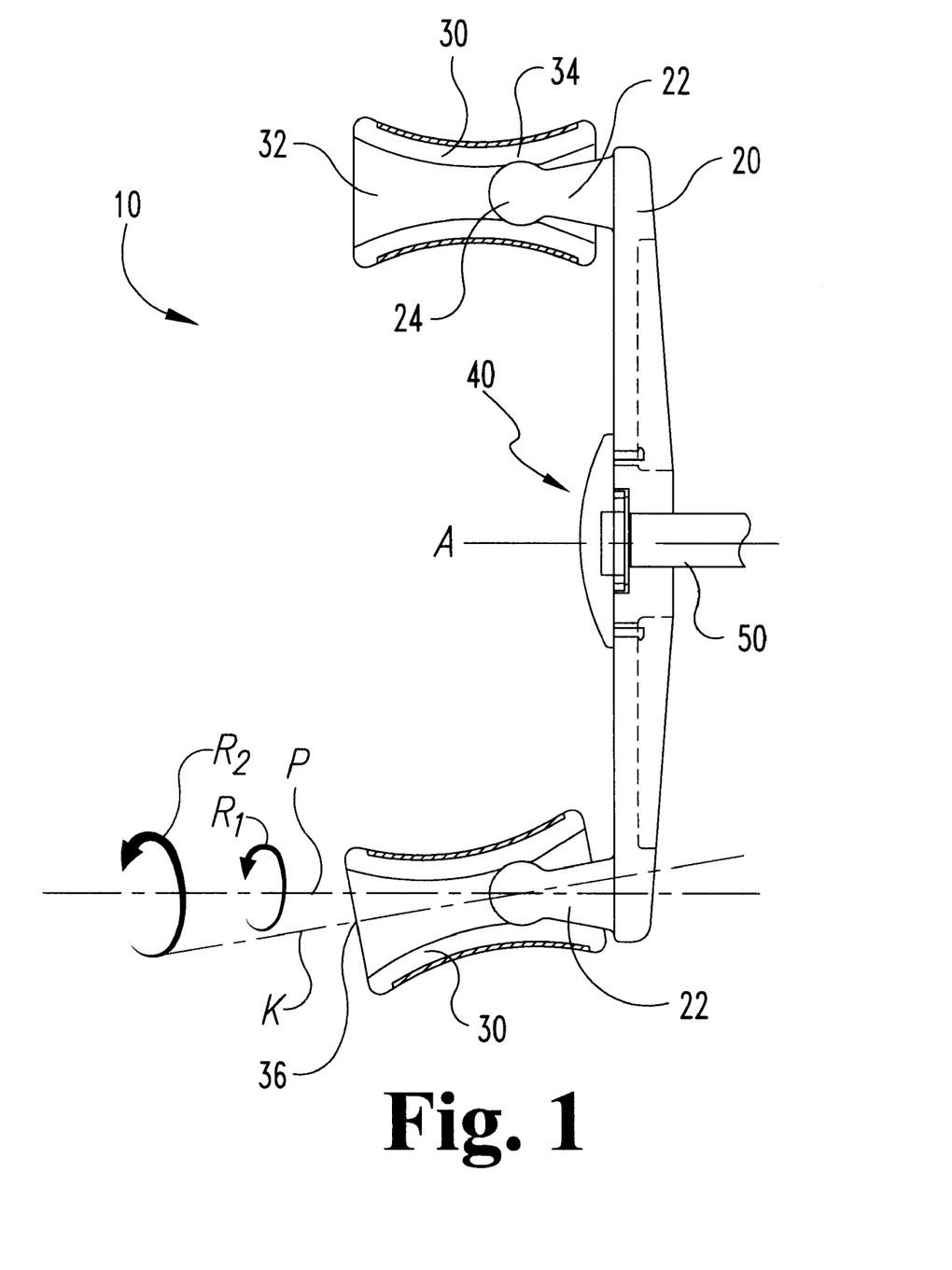
FIG. 1 is a partially cut-away side view of a handle assembly illustrating a knob and handle, and attachment to a shaft, according to one preferred embodiment of the present invention.
Figure 2:
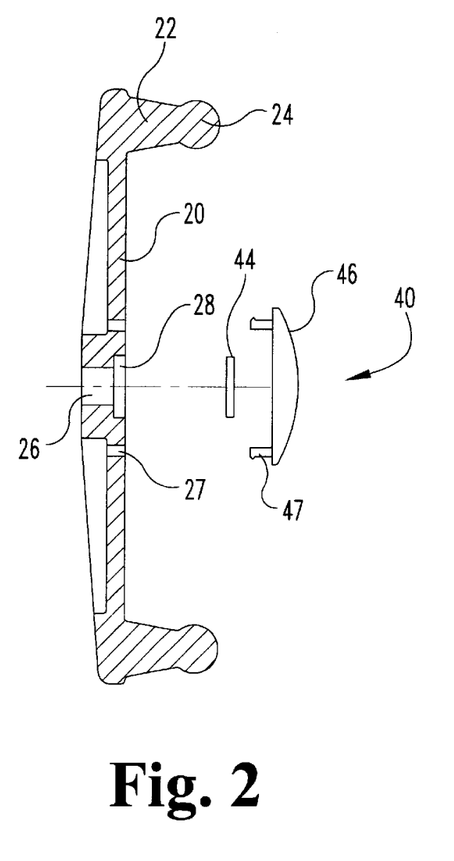
FIG. 2 is a side, exploded view of portions of the handle assembly of FIG. 1.
Figure 3:
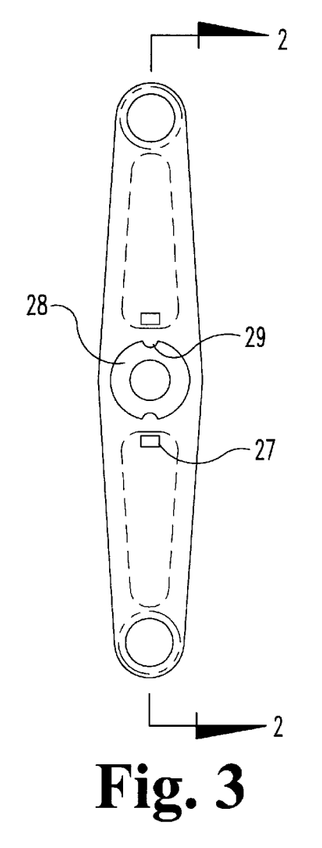
FIG. 3 is a front view of the handle assembly mechanism of FIG. 1.

In the preferred embodiment illustrated in FIGS. 1–3, a pedestal 22 is mounted to the distal end of each arm of cross-member 20. Each pedestal 22 defines a pedestal long axis P. Pedestal 22 extends from cross-member 20, parallel to shaft 50 in some embodiments, and may be mounted via a screw and threaded opening, welding, a nut and bolt, or similar attachment means. Pedestal 22 terminates in a spherical ball portion 24.

Mounted to pedestal 22 is knob 30. The outer portion of knob 30 is contoured to be gripped by a user such as between a thumb and finger. The interior of knob 30 defines a channel 32 and mounting or socket portion 34. Mounting portion 34 is configured to receive spherical ball portion 24 of pedestal 22, forming a ball-and-socket type joint. When assembled, such as by snap fit, mounting portion 34 allows twisting or rotational movement of knob 30 around pedestal axis P, as shown by arrow $R_1$, without knob 30 disengaging from pedestal 22.

Additionally, as further illustrated in FIG. 1, each knob 30 preferably defines a central knob axis K. Knob 30 is preferably mounted so knob axis K intersects pedestal axis P in the mounting portion, such as in the center of ball portion 24. Knob axis K may coincide with pedestal axis P, preferably its normal position, or the distal portion 36 may diverge around pedestal axis P. The mounting assembly preferably allows the outer end portion 36 of knob 30 to be moved within a conical volume around pedestal axis P. The cone has an apex at the intersection of axes P and K, and outer walls illustrated by arrow $R_2$. Thus, in addition to twisting rotation $R_1$ about knob axis K, knob 30 is movable within the cone in at least two axes of freedom with respect to cross-member 20 without requiring the user to change a grip.

Figure 7:
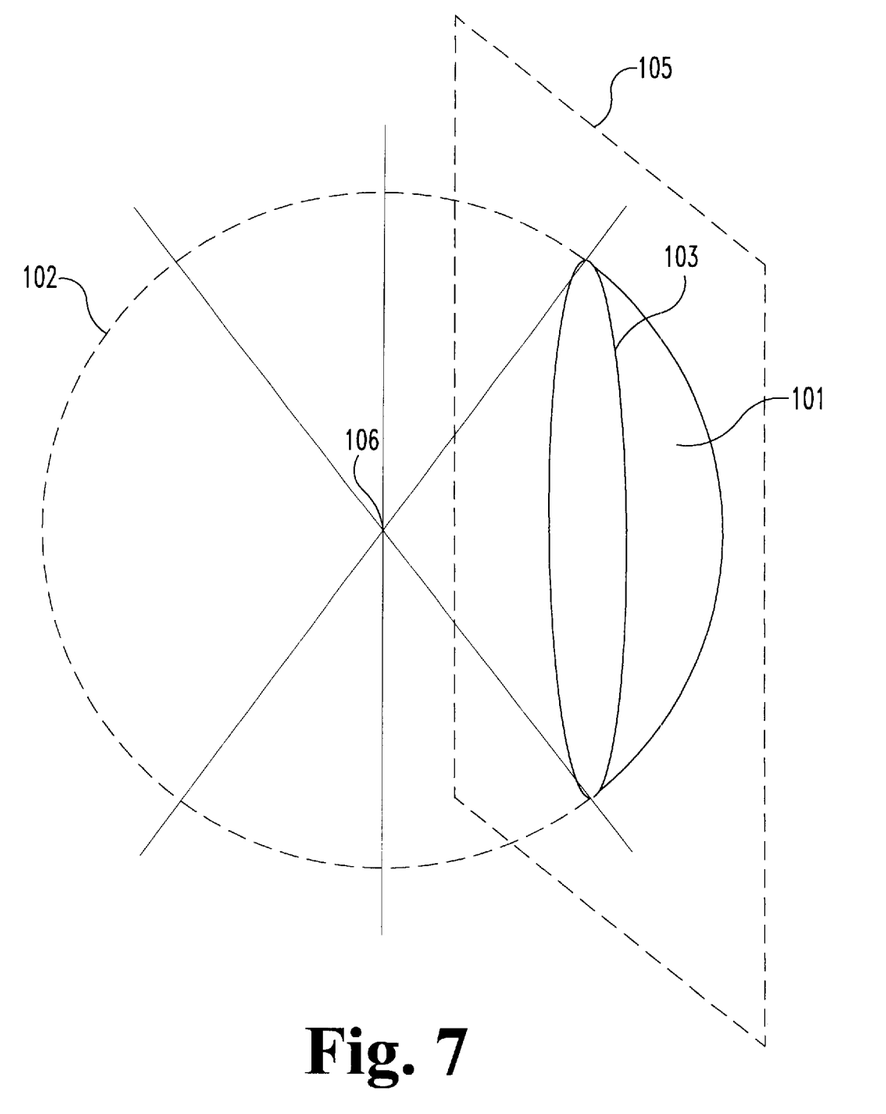
FIG. 7 is an illustration of a small circle spherical surface segment.

The area within which the distal portion 36 of knob 30 is movable is mathematically known as a spherical small circle surface segment, illustrated for clarity in FIG. 7 with reference number 101. As illustrated, a small circle 103 of a sphere 102 is defined by where the sphere 102 is bisected by a plane 105, where plane 105 is not coincident with the sphere's center 106. Small circle 103 is sometimes referred to as a line of latitude. Small circle 103 divides the surface area of the sphere into two unequal areas. The smaller of the two unequal areas is defined as a spherical small circle surface segment 101.

As illustrated in FIGS. 1–3, preferably handle 10 includes two distal arms on cross-member 20 which extend from shaft mounting assembly 40 to distal portions upon which the pedestals are mounted. As an alternate embodiment, the distal arms could terminate in mounting portions which directly attach to knob 30. In one preferred embodiment (not shown), distal arms 20 are perpendicular to or angled outward from shaft 50 and form ball portions which connect directly to sockets in knobs 30. Alternately, distal arms 20 could define sockets, where knobs 30 include ball portions which couple to the sockets.

In certain embodiments, handle 10 can be attached to a rotatable shaft 50 using standard mounting methods. Examples of standard mounting methods include riveting or welding handle 10 to rotatable shaft 50; using cotter keys, set screws, or lock washers along with mounting portions, such as grooves or holes, in rotatable shaft 50; or inserting a screw into a threaded opening in the step end portion of rotatable shaft 50. One improved assembly for mounting handle 10 to rotatable shaft 50 is described below.

One embodiment of the mounting assembly 40 is illustrated in FIGS. 1, 2 and 3. In this embodiment, cross-member 20 defines recessed portion 28 around mounting location 26. A locking member 44, such as a star washer, is received within portion 28. Locking member 44 has an interior channel with a cross-section, such as a rounded rectangle (FIG. 5), which mates with a corresponding non-circular cross-section of shaft 50 (FIG. 1) Recessed portion 28 includes two protuberances 29 which engage the outer circumference of locking member 44 and prevent relative rotation of the shaft and handle. Cap 46 is mounted over recessed portion 28 and locking member 44 to hold the assembly together. Cap 46 includes prongs 47 which extend through and lock with openings 27 adjacent to recessed portion 28.

Figure 4A:
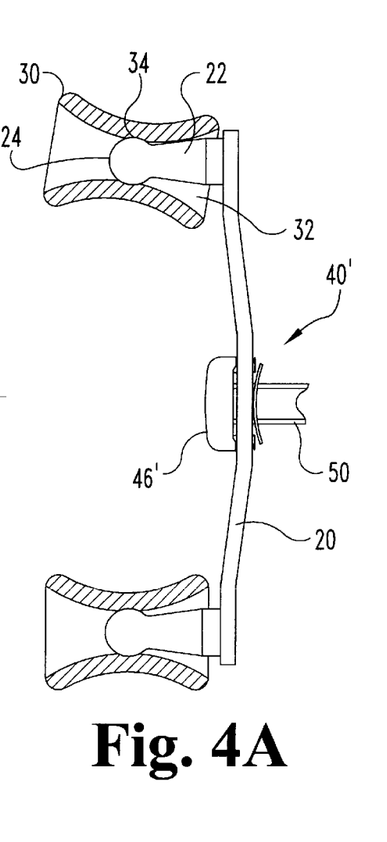
FIG. 4A is a side view of a handle and rotatable shaft assembly according to an alternate preferred embodiment of the present invention.
Figure 4B:
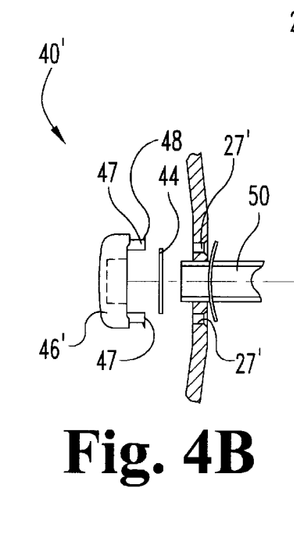
FIG. 4B is an exploded side view of a portion of the shaft assembly of FIG. 4A.
Figure 5:
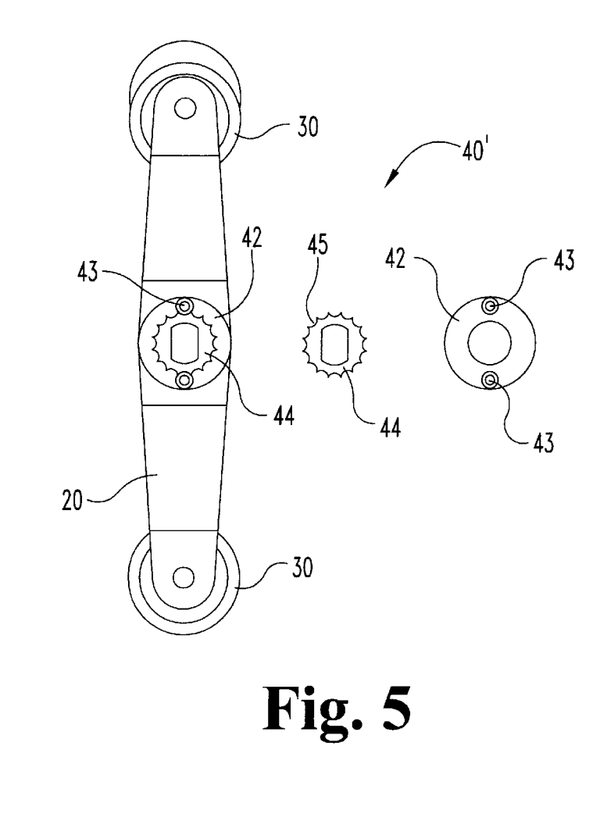
FIG. 5 is a rear view of the handle assembly of FIG. 4A.

Illustrated in FIGS. 4A, 4B and 5 is an alternate improved shaft mounting assembly 40' for attaching a cross-member 20 to a rotatable shaft 50. Shaft mounting assembly 40' includes a restraining member, such as a washer or bushing 42; cap 46'; and a locking member, such as star locking plate 44. Preferably, shaft 50 defines a substantially non-circular cross section end portion for attachment to the handle. Some embodiments use a substantially rectangular, starred, or notched non-circular cross section at the shaped end portion of rotatable shaft 50.

As illustrated, restraining member 42 includes one or more engaging portions or openings 43. Cap 46' includes one or more prongs 47, with one or more locking flanges 48 at the end of each prong 47. Locking member 44 preferably includes an inner opening corresponding in cross-section to the non-circular shaped end portion of rotatable shaft 50. In a preferred embodiment, locking member 44 includes an outer periphery with locking portions 45. One embodiment of locking member 44 is a star washer with an outer edge that is substantially scalloped.

When assembled, restraining member 42 is first placed on shaft 50. Cross-member 20 is then placed over the end of shaft 50 adjacent to restraining member 42. Locking member 44 is mounted to shaft 50 with the inner opening engaging the non-circular end portion of rotatable shaft 50. Preferably, cap 46' is mounted over the shaped end portion of rotatable shaft 50. As cap 46' is placed in position, prongs 47 fittingly engage the periphery 45 in locking member 44, and extend through openings 27' in cross-member 20. Locking flanges 48 are compressed during placement of cap 46', and "snap" into place when cap 46' is positioned. Locking flanges 48 engage the rear portion of cross-member 20 to inhibit removal. In an alternate embodiment, prongs 47 also extend through engagement portions 43 in restraining member or washer 42 and locking flanges 48 engage the rear portion of washer 42.

Thus, cap 46', locking member 44, cross-member 20, and restraining member 42 are maintained in physical communication, preventing relative rotational movement of cross-member 20 and shaft 50. Rotation of cross-member 20 results in rotation of rotatable shaft 50, and rotation of rotatable shaft 50 results in rotation of cross-member 20.

In a further alternate embodiment, cap 46' is a locking member which has a recessed portion that fittingly receives the substantially non-circular shaped end portion of rotatable shaft 50, and separate locking member 44 is not required. Prongs 47 of cap 46' fittingly engage openings in the cross-member and the recessed portion of the cap to connect the rotatable shaft 50 and cross-member 20.

Shaft mounting assembly 40 can be used for various structures where a transverse member attaches to a rotatable shaft. Example structures include, but are not limited to, window cranks, plumbing fixtures and gear mechanisms. Cross-member 20, knob 30 and mounting assembly 40 may be made of standard materials known in the art, such as aluminum, steel, stainless steel or similar metals, or they can be made from durable plastics, such as a nylon, polyester or polyethylene with sufficient strength and rigidity. In a preferred embodiment, pedestal 22 and spherical ball portion 24 are self-lubricating with respect to mounting portion 34 of knob 30.

Figure 6:
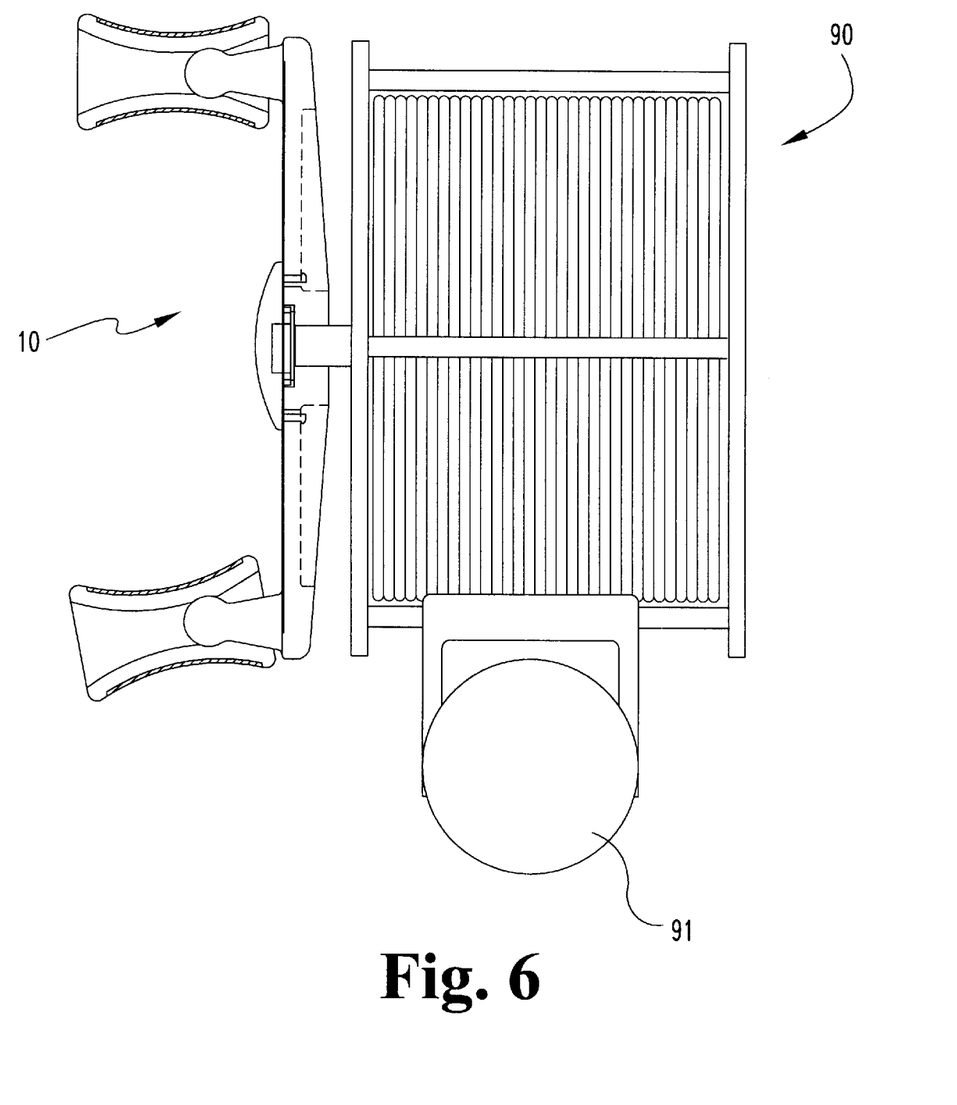
FIG. 6 is a side view of an assembled fishing reel and fishing pole.

FIG. 6 illustrates an example of one preferred embodiment of the present invention including handle 10 mounted to a reel 90. Reel 90 is mounted to a fishing pole 91 using standard connectors and brackets.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fishing pole assembly, comprising:
   a fishing pole;
   a reel mounted to said fishing pole, wherein said eel includes a rotatable shaft;
   a cross-member mounted to said rotatable shaft at a shaft connection point;
   a mounting portion on said cross-member, wherein said mounting portion is offset from said shaft connection point; and
   a knob connected to said mounting portion with a all-and-socket joint, wherein said knob is movable in more than one dimension.

2. The handle of claim 1 wherein said knob defines the socket portion of said ball-and-socket joint and wherein said mounting portion o said cross-member defines the ball portion of said ball-and-socket joint.

3. The handle of claim 2 wherein said cross-member further comprises a pedestal attached to said cross-member at said mounting portion, and wherein said pedestal includes the ball portion of said ball-and-socket joint.

4. A handle and shaft assembly, comprising: a rotatable shaft with a shaped end portion, wherein said shaped end portion is non-circular in cross-section and said rotatable shaft defines an axis of rotation;
   a handle cross-member wherein said cross-member is mounted perpendicularly to said rotatable shaft at a shaft mounting location;
   at least a first distal portion of said cross-member offset from said shaft mounting location;
   a first pedestal having a long axis, mounted to said at least one distal portion of said cross-member;
   a first ball portion associated with said first pedestal;
   a first knob defining a socket, wherein said socket couples to said first ball portion; and,
   a locking member wherein said locking member is fittingly engaged to said shaped end portion of said rotatable shaft such that said locking member and said rotatable shaft are substantially rigid in rotation, and said locking member is fittingly engaged with said cross-member such that said locking member and said cross-member are substantially rigid in rotation.

5. The handle and shaft assembly of claim 4 wherein said locking member is a cap, wherein said cap has one or more prongs, and wherein said prongs are received within corresponding openings defined in said cross-member.

6. The handle and shaft assembly of claim 5 wherein said prongs further comprise one or more locking flanges, wherein said locking flanges engage said cross-member to inhibit removal of said cap.

7. The handle and shaft assembly of claim 4 wherein said locking member is a washer wherein said washer defines an internal channel which engages the shaped end portion of said shaft and wherein said washer has a periphery which engages said cross-member to prevent relative rotational movement between said cross-member and said shaft.

8. The handle and shaft assembly of claim 7 wherein said washer has a scalloped periphery which engages at least one protuberance defined in said cross-member.

9. The handle and shaft assembly of claim 8 wherein said cross-member has a recessed portion which receives said washer, and wherein said at least one protuberance is formed in said recessed portion.

10. The handle and shaft assembly of claim 7 further comprising a cap with one or more prongs which extend through corresponding openings defined is said cross-member, and wherein said washer has a scalloped periphery which gages one or more of said prongs.

11. The handle and shaft assembly of claim 10 wherein said shaped end portion of said rotatable shaft has a rounded rectangular cross-section.

12. The invention of claim 4 wherein sad cross-member further comprises:
    a second distal portion offset from said shaft mounting location;
    a second pedestal having a long axis, mounted to said second distal portion of said cross-member; wherein the long axis of said second distal portion is parallel to the axis of rotation of said rotatable shaft;
    a second ball portion mounted to said second pedestal; and,
    a second knob that defines a second socket, wherein aid second socket couples to said second ball portion of said second pedestal.

13. A handle for a fishing reel, comprising:
    a cross-member mountable to a fishing reel rotatable shaft wherein the rotatable shaft defines a rotation axis;
    wherein said cross-member has a distal portion displaced a perpendicular distance from the rotatable shaft, wherein said cross-member distal portion defines a cross-member distal portion axis parallel to said rotation axis; and,
    a knob coupled to said cross-member distal portion at a couple point and extending from said couple point to a knob distal portion;
    wherein said knob defines a knob axis, wherein said knob axis passes through said couple point, wherein said knob is rotatable about said knob axis; and,
    wherein said coup ring of said knob allows said knob axis to be positioned at any orientation within a cone that opens from said coupling point toward said distal portion of said knob along said cross-member distal portion axis.

14. The handle of claim 13 wherein said knob distal portion is movable within an area defined by a spherical small circle surface segment wherein the center of the sphere is coincident with said couple point.

15. An assembly for mounting a handle to a shaft, comprising:

a rotatable shaft with a shaped end portion, wherein said shaped end portion is non-circular in cross-section and said rotatable shaft defines an axis of rotation;

a handle cross-member wherein said cross-member is mounted perpendicularly to said rotatable shaft at a shaft mounting location; and, a washer wherein said washer defines an internal channel with a cross-section which engages the shaped end portion of said shaft and wherein said washer has a periphery which engages said cross-member such that said washer and said rotatable shaft are substantially rigid in rotation, and said washer is fittingly engaged with said cross-member such that said washer and said cross-member are substantially rigid in rotation.

16. The handle and shaft assembly of claim 15 wherein said shaped end portion of said rotatable shaft has a rounded rectangular cross-section.

17. The handle and shaft assembly of claim 15 wherein said washer has a scalloped periphery which engages at least one protuberance defined in said cross-member.

18. The handle and shaft assembly of claim 17 wherein said cross-member has a recessed portion which receives said washer, and wherein said at least one protuberance is formed in said recessed portion.

19. The handle and shaft assembly of claim 15 further comprising a cap with one or more prongs which extend through corresponding openings defined is said cross-member, and wherein said washer periphery engages said one or more prongs.

* * * * *

UNITED STATES PATENT AND TRADEMARK OFFICE
CERTIFICATE OF CORRECTION

PATENT NO. : 6,666,396 B2
DATED : December 23, 2003
INVENTOR(S) : Landwerlen

It is certified that error appears in the above-identified patent and that said Letters Patent is hereby corrected as shown below:

Column 5,
Line 37, replace "eel" with -- reel --.
Lines 44-45, replace "all-and-socket" with -- ball-and-socket --.
Line 49, replace "o" with -- of --.

Column 6,
Line 34, replace "gages" with -- engages --.
Line 48, replace "aid" with -- said --.
Line 66, replace "coup ring" with -- coupling --.

Signed and Sealed this

Third Day of August, 2004

JON W. DUDAS
*Acting Director of the United States Patent and Trademark Office*